United States Patent Office 3,141,416
Patented July 21, 1964

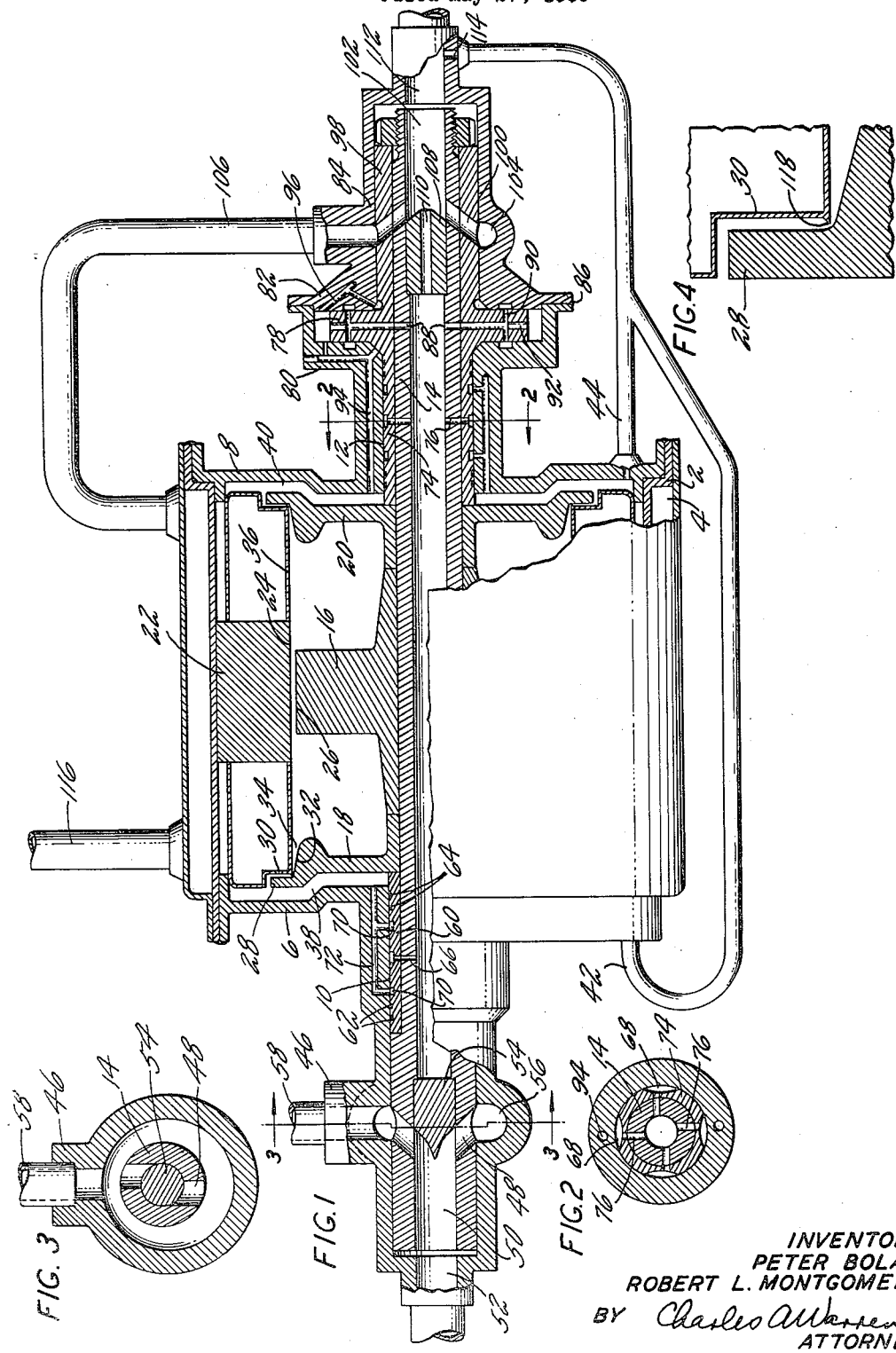

3,141,416
MOTOR FOR PUMPING LIQUID METALS
Peter Bolan, West Hartford, and Robert L. Montgomery, Windsor, Conn., assignors to United Aircraft Corporation, East Hartford, Conn., a corporation of Delaware
Filed May 27, 1960, Ser. No. 32,473
5 Claims. (Cl. 103—87)

This invention relates to a pump and motor combination particularly adapted for pumping liquid metals.

One feature of the invention is the use of the liquid being pumped as a lubricant for the bearings. Another feature is an arrangement for removing any of the liquid escaping from the bearings into the motor housing thereby to keep the stator and rotor of the motor free of any drops of this liquid.

One feature of the invention is an arrangement for supplying the lubricating fluid to the bearings. Another feature of the invention is the use of a second pump for circulating a coolant for the motor, the coolant being the same liquid as the main liquid being pumped with the cooling fluid from the second pump also constituting the lubricant and with a return duct to the second pump for fluid collecting in the sump within the motor housing.

Other features and advantages will be apparent from the specification and claims, and from the accompanying drawing which illustrates an embodiment of the invention.

FIG. 1 is a longitudinal sectional view through the pump and motor assembly.

FIG. 2 is a sectional view along the line 2—2 of FIG. 1.

FIG. 3 is a sectional view along the line 3—3 of FIG. 1.

FIG. 4 is an enlarged fragmentary sectional view of the detail.

The invention is shown in a pump and motor assembly adapted particularly for pumping liquid metals such as sodium. The invention includes a motor housing having an outer wall 2 which incorporated an annular chamber 4 for coolant and end walls 6 and 8 secured to the outer wall. The end walls 6 and 8 have bearing surfaces 10 and 12 which support a shaft 14 therein. The shaft has mounted thereon the rotor 16 for the motor and also carries discs 18 and 20 located within the motor housing and adjacent to the end walls thereof. The stator 22 for the motor is positioned within and supported by the motor housing and has an inner peripheral surface 24 in close spaced relation to the peripheral surface 26 on the rotor. The motor may be an electric motor.

Each disc 18 or 20 has a peripheral portion 28 closely spaced from an adjacent radial surface 30 on the stator so that as the disc rotates with respect to the stator a pumping action takes place between the inner surface of the peripheral portion 28 and the surface 30. Inwardly of the peripheral portion 28, each disc has a frusto-conical surface 32 converging in a direction toward the other disc and thereby forming a wedge-shaped space 34 between the surface 32 and the adjacent surface of the stator 22. Any fluid within the space between the discs 18 and 20 will be thrown out against the inner surface 36 of the stator where it is ultimately picked up in the wedge-shaped space 34 and pumped out into sumps 38 and 40 between the end walls of the housing and the adjacent discs 18 and 20. The sumps 38 and 40 are drained by conduits 42 and 44, as will be more fully described later.

The end wall 6 for the motor housing carries an integral pump housing 46 which receives the end of the shaft 14, the latter having slots 48, FIG. 3, therein which constitute the operative pump element. The slots communicate the with a bore 50 in the housing constituting a pump inlet which in turn communicates with a duct 52 in the end of the pump housing 46. The shaft 14 is hollow, as shown, and has a plug 54 positioned therein to direct the pump flow into the passages 48. The pump passages 48 deliver the fluid into an annular collecting chamber 56 in the pump housing 46 for discharge through the passage 58. This pump is the main pump which delivers the liquid metal to a point of use.

Within the bearing surface 10, the shaft 14 carries a bearing sleeve 60 having seal rings 62 and 64 adjacent opposite ends and having centrally located substantially radially extending pumping passages 66 which pump liquid out of the hollow shaft 14 and into grooves 68 cut in the periphery of the sleeve 60 for the delivery of liquid to the bearing surface. On opposite ends of and in spaced relation to the grooves 68 are annular grooves 70 which collect excess of lubricant from the bearing. The liquid collecting in the grooves 70 discharges into the space 38 through passages 72 in the housing.

Within the bearing surface 12 the shaft 14 carries another bearing ring 74 which is similar in construction to the bearing ring 60 and has similar lubricating passages and collecting grooves. It will be understood that the passage 66 and the similar passages 76 for the bearing sleeve 74 extend through the shaft as well as through the bearing sleeves. The bearing sleeve 74 carries a radially extending flange 78 which is located between a cooperating radial flange 80 on the end 8 for the housing and a corresponding flange 82 on a pump housing 84 positioned over the right-hand end of the shaft 14. The pump housing 84 is suitably secured as by welding 86 to the housing end 8 and in operation is essentially a part of the main housing, the flanges 80 and 82 defining between them a recess to receive the flange 78.

Radial passages 88 through the shaft 14 and through the flange 78 cooperates with transverse passages 90 for supplying lubricant to opposite side surfaces of the flange 78. The outer ends of the passages 88 are plugged as at 92. Lubricant escaping from the bearing surfaces on the opposite sides of the flanges 78 is directed through passages 94 in the housing end 8 and passages 96 in the flange 82.

Projecting to the right beyond the flange 78 and rotating with the shaft 14 is an integral sleeve 98 which has substantially radially extending pumping passages 100 therein to deliver fluid from an axial inlet 102 into the annular collecting space 104 and thence through a conduit 106 to the cooling chamber 4. A plug 108 positioned in the shaft 14 adjacent to the passages 100 directs the pump fluid into these passages and also permits a measured amount of liquid to flow through a central passage 110 therein into the hollow shaft at the left of the plug for a lubrication process.

The pump housing 84 has an inlet passage 112 in alignment with the passage 102 to provide for supplying fluid to the pump and the conduits 42 and 44 from the sump within the housing communicates with a lateral passage 114 so that fluid in these conduits is delivered into the passage 112. The cooling chamber 4 has an outlet conduit 116 from which the cooling fluid is delivered either directly or through a radiator or a heat exchanger, not shown, to the inlet passage 112.

When the assembly is not in operation, some of the liquid may escape into the housing and must be removed for normal operation of the motor and pump. As above stated, the peripheral flange 28 on the disc 18 or 20 and the cooperating surface 30 provides a pumping action which removes fluid from within the housing between the discs 18 and 20 and discharges it into the narrow spaces 38 and 40 between each of the discs and the adjacent housing end. Thus, after a brief operation of the device, the space between the discs 18 and 20 will be free of the lubricating or pumped liquid. To assist in keeping the liquid from returning into this space, the inner corner of the surface 30 has a projecting rib 118 thereon, as shown in FIG. 4, which extends toward the adjacent surface of the flange 28. With this arrangement, any liquid on the surface 30 and flowing down on that surface will be dropped from the tip of the rib 118 onto the surface of the peripheral flange and carried out by centrifugal force. Furthermore, any liquid collecting in the wedge-shaped groove 34 will be carried out by centrifugal force and be discharged into the collecting space 38 and 40 and will then be returned to the pump inlet by the conduits 42 and 44.

It is to be understood that the invention is not limited to the specific embodiment herein illustrated and described, but may be used in other ways without departure from its spirit as defined by the following claims.

We claim:

1. A combined pump and motor having a housing of substantially circular cross-section with a motor stator therein, a shaft journalled in the housing and having a rotor for the motor thereon, a first pump having a rotor also mounted on the shaft at one end of said housing, a bearing between the rotors, means for supplying liquid from the pump to the bearing for lubricating it, a secondary pump means within the housing adjacent the periphery for removing liquid from the housing, a second pump rotor mounted on the shaft at the end of the housing remote from the first pump, a pump housing surrounding said second pump rotor and connected to the housing and constituting with said rotor a main pump driven by the motor, a hollow annular cooling chamber enveloping said motor stator, first conduit means joining said first pump outlet to said cooling chamber, and second conduit means joining said cooling chamber to said first pump inlet.

2. Apparatus according to claim 1 wherein said first pump and its conduits and said second pump and its conduits are independent and out of communication.

3. Apparatus according to claim 1 wherein said housing has an enlarged central portion containing said motor stator and rotor and said secondary pump means and forms a sump therefor, and third conduit means joining said sump to said first pump inlet.

4. Apparatus according to claim 1 including metering means within said shaft to meter lubricant flow to said bearing.

5. A pump and motor assembly of circular cross-section and concentric about an axis for pumping liquid metals including a motor housing with a stator therewithin, having radially projecting ribs in the end walls thereof, said housing including opposite end walls defining a chamber therebetween, bearings in said end walls, a hollow shaft journalled in said bearings and having a rotor for said motor thereon located within the chamber, two discs on said shaft within and at opposite ends of the housing chamber and each axially spaced from the motor rotor, said discs overlying radially an end wall of the stator and having a peripheral portion closely spaced to said end wall ribs of said stator to form between said peripheral portion and said end wall a secondary pump means for removing in two opposite directions the liquid from the space around the rotor and between the rotor and stator, said pump having an axial inlet and said shaft having an axial passage therein from said inlet and radial passages in said shaft in alignment with said bearings for delivery of liquid from the axial passage to the bearings, said shaft having a flange thereon and said housing having a recess therein receiving the flange in closed axial relation and with said flange and said housing presenting axially spaced bearing surfaces of substantial area to define the thrust bearing for said shaft, said flange having radial and transverse passages therein communicating with the shaft passage to supply liquid from within the shaft to the bearing surfaces of said flange.

References Cited in the file of this patent

UNITED STATES PATENTS

| | | |
|---|---|---|
| 2,369,440 | Curtis | Feb. 13, 1945 |
| 2,669,187 | Guyer | Feb. 16, 1954 |
| 2,830,541 | Higgins et al. | Apr. 15, 1958 |
| 2,885,963 | Ivanoff | May 12, 1959 |
| 2,913,988 | White | Nov. 24, 1959 |

FOREIGN PATENTS

| | | |
|---|---|---|
| 682,015 | Great Britain | Nov. 5, 1952 |